June 2, 1931.  C. P. HEGAN ET AL  1,807,983
AIR OR GAS PURIFIER
Filed March 12, 1924
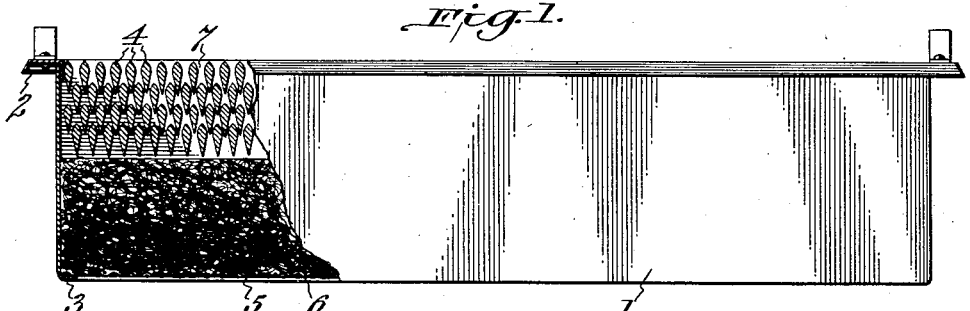
Fig. 1.
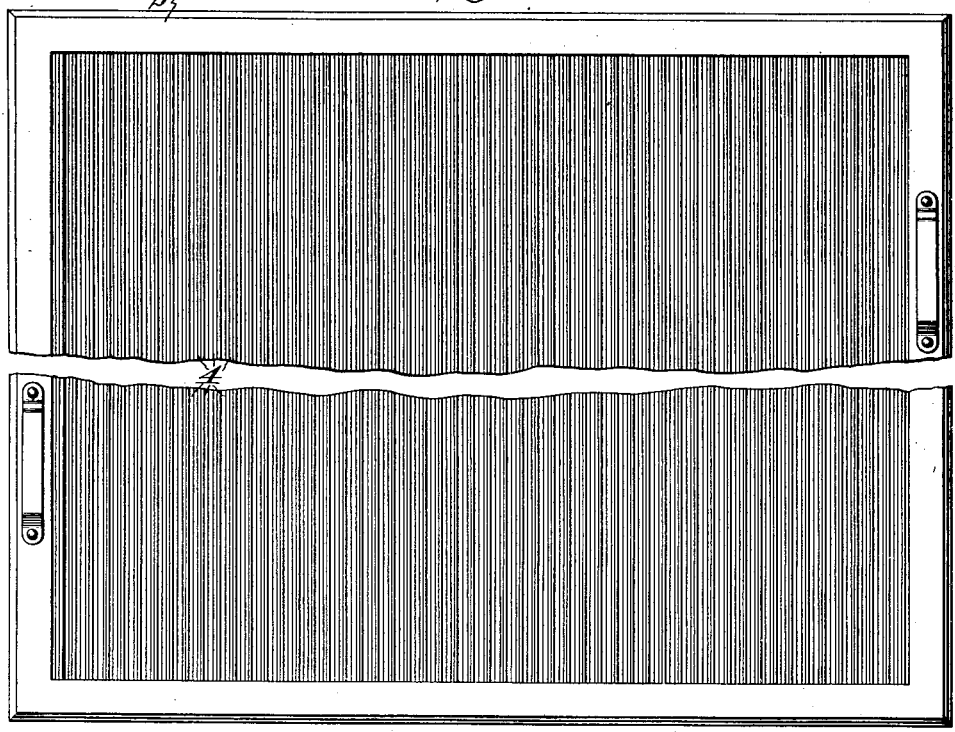
Fig. 2.
 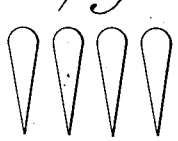 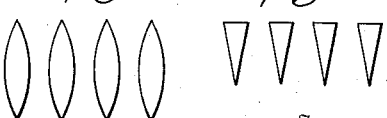
Fig. 3.  Fig. 4.  Fig. 5.  Fig. 6.
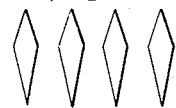 
Fig. 7.  Fig. 8.
Inventors
Chester P. Hegan,
Walter B. Ducks,
By Byrne Townsend & Breckenstein,
Attorneys.

Patented June 2, 1931

1,807,983

UNITED STATES PATENT OFFICE

CHESTER P. HEGAN AND WALTER B. DIECKS, OF LOUISVILLE, KENTUCKY, ASSIGNORS, BY MESNE ASSIGNMENTS, TO AMERICAN AIR FILTER COMPANY, INC., OF LOUISVILLE, KENTUCKY, A CORPORATION OF DELAWARE

AIR OR GAS PURIFIER

Application filed March 12, 1924. Serial No. 698,745.

The invention relates to gas purifying and scrubbing devices and particularly to the "adhesive impingement" type of devices in which the gas is freed from dust, dirt and other impurities by repeated scrubbing contacts with elements against which the gas impinges. In devices of this type, a certain percentage of the impurities entrained in the gas are removed by the impact of the gas against the first set of adhesive surfaces and each succeeding impact against adhesive surfaces serves to remove the same proportion of the remaining impurities. Known forms of deflection purifiers are open to the objections that the purifiers either offer a high resistance to the passage of the gas or, if the gas-flow resistance is low, a great number of impacts are required to free the air from impurities. When the gas-flow resistance is low, the purifier need be cleaned only at long intervals but the purifier is necessarily large and bulky. If the purifier is made smaller, a high initial gas-flow resistance results, and this resistance increases rapidly as the removed impurities collect on the elements, thus necessitating frequent cleanings.

An object of our invention is to provide an improved form of deflection elements which may be arranged to form a compact purifier having a low resistance to the gas flow. A further object is to provide a compact gas purifier which will offer low gas-flow resistance and which will not readily clog up with considerable quantities of deposited impurities. More specifically an object of our invention is to provide an efficient gas-purifier in which the bulk of the impurities is removed by impact against suitably formed adhesive surfaces, while the fine cleaning is secured by impingement against a mass of metal fibers or metal wool coated with a suitable adhesive substance and preferably arranged with progressively decreasing voids so arranged as to present smaller interstices to the air flow as the volume of solids to be removed is progressively decreased.

These and other objects of our invention are attained in the embodiment of our invention which is illustrated in the accompanying drawings, in which Fig. 1 is an end elevation, partly in section, of a purifier unit, Fig. 2 is a plan view of the unit, and Figs. 3 to 8 are end elevations of deflection elements embodying our invention.

In the drawings which illustrate the invention as applied to an air purifying unit such as disclosed in the patents to William M. Reed, Nos. 1,416,381 and 1,483,379, the open frame which is designated by the numeral 1 has a peripheral flange 2 attached to its outer edge and an inturned flange 3 formed on its inner edge. The deflection elements 4 which are arranged within the frame 1 at its outer or air inlet side comprise a plurality of rows of parallel bodies of stream line cross-section, the elements of adjacent rows being staggered and interleaved. As shown, four rows of elements are used and behind these deflectors is arranged a filtering mass 5 of loosely felted fibrous material such as metal fibers or wool which may be retained by a foraminous sheet 6 of woven wire screen or the like. The deflector elements 4 may be attached directly to the frame 1 but preferably are first assembled upon end plates 7 to form an integral structure which may be placed within the frame and upon the filter mass.

In Fig. 3, we have illustrated the stream line bodies 4 on a larger scale and while the true stream line cross section is believed to be the most efficient, good results may be attained by elements having shapes which are substantially or approximately stream line. As shown in Fig. 4, the forward ends of the elements may be rounded off or the elements may be otherwise modified so long as they retain substantially the stream line shape. By the term "stream line" is meant elements of a shape designed to offer minimum resistance to gas flow, such elements being in general characterized by the fact that in cross section they are of greater length in the direction of gas flow than width and by the fact that they taper off from the point of maximum width to a substantially pointed tail which serves to minimize the formation of eddy currents at the rear of the element. Frequently, although not necessarily, the point of maximum width is nearer the nose than the tail of the element. Elements having such cross-sections when assembled in a purifier offer a low resistance to the scrubbing and air flow and the accumulated impurities do not cause a rapid increase in the air-flow resistance.

The deflector elements 4 as well as the fibrous filtering mass are coated with oil or other viscous material to which the dust and other impurities will adhere. As air enters the purifier, the impact of the air and entrained impurities against the first row of deflectors results in the removal of probably sixty per cent of the impurities, including of course, the larger particles. The second and each succeeding row of deflectors removes approximately sixty per cent of the remainder, and so on throughout the filter. For some uses, the air may be purified to the desired extent by contact with four rows of deflectors or scrubbers, but it is obvious that our invention does not contemplate any particular number of impacts as additional rows may be employed or discarded in accordance with the degree of purity desired. For many purposes the desired cleansing of the air may be attained by increasing the number of rows of deflectors, but when air substantially free from all impurities is desired we have found it desirable to remove the last traces of impurities by the use of metal fibers or wool with progressively smaller voids as the material to be removed is progressively decreased in quantity by successive impingements.

A purifier unit such as illustrated is particularly advantageous when the air to be cleansed contains a relatively high amount of large impurities. For example, air in textile factories may contain a considerable amount of lint or fiber and in factories where paint, enamel or varnish are applied by spraying a considerable quantity of such materials is entrained in the air. When an attempt is made to filter such air these impurities sometimes obstruct the passages at the outer face of the filter to an undesirable extent and frequent cleaning of the filters are required. These impurities however may be removed by a deflection and scrubbing purifier embodying our invention without obstructing the air passages therethrough. The deposited material will gradually accumulate upon the deflectors or scrubbers, but when substantially stream line shapes are employed the initial air-flow resistance is low and it increases but slowly as impurities accumulate. By removing the larger impurities with stream line deflector elements, the fibrous mass will function with added efficiency over a long period without cleaning.

It is obvious that purifiers constructed in accordance with our invention may be employed for cleansing a gas or gaseous mixture other than air. We have illustrated the deflector elements as solid bodies, but hollow perforated bodies enclosing wicks for distributing the viscous fluid to the elements may be employed if desired. This and other changes in the several parts, their relative size and arrangement fall within the scope of our invention as set forth in the following claims.

We claim:—

1. In a device for separating solids from a gas, a plurality of rows of deflector elements having imperforate faces directed towards the incoming gas stream, said elements being coated with a viscous adhesive substance, the elements of adjacent rows being staggered with respect to each other and each of said elements comprising a body having a length in the direction of the gas stream which is greater than its width.

2. The invention as claimed in claim 1 wherein said elements comprise stream line bodies.

3. The invention as claimed in claim 1, wherein said elements comprise stream line bodies and the elements of adjacent rows are interleaved.

4. In a device for separating solids from a gas, an open frame, and a plurality of deflector elements carried by said frame, said elements being coated with a viscous adhesive substance, each of said elements having an imperforate face presented to the incoming gas stream and having a length in the direction of air flow which is greater than its width.

5. The invention as claimed in claim 4, wherein said elements comprise stream line bodies.

6. The invention as claimed in claim 4, wherein said elements comprise stream line bodies arranged in rows, the elements of adjacent rows being interleaved.

7. A gas purifier unit comprising an open frame, a plurality of deflector elements of stream line cross-section carried by said frame at the entrance side thereof and a mass of filtering material in said frame at the outlet side thereof, said deflector elements and said mass of filtering material both being coated with viscous adhesive material.

8. A gas purifier unit comprising an open frame, a plurality of rows of deflector elements of stream line cross-section carried by said frame at the entrance side thereof, the elements of adjacent rows being staggered with respect to each other, and filtering material between said deflector elements and the outlet side of said frame, said deflector elements and said filtering material both being coated with viscous adhesive material.

9. A gas purifier unit as claimed in claim 8 wherein the elements of adjacent rows are interleaved.

In testimony whereof, we affix our signatures.

CHESTER P. HEGAN.
WALTER B. DIECKS.